(12) United States Patent
Guzman

(10) Patent No.: US 7,033,976 B2
(45) Date of Patent: Apr. 25, 2006

(54) FLUID SYSTEM ADDITIVE

(75) Inventor: Jose Guzman, Houston, TX (US)

(73) Assignee: M-I L.L.C., Houston, TX (US)

( * ) Notice: Subject to any disclaimer, the term of this patent is extended or adjusted under 35 U.S.C. 154(b) by 303 days.

(21) Appl. No.: 10/336,880

(22) Filed: Jan. 6, 2003

(65) Prior Publication Data

US 2004/0132626 A1   Jul. 8, 2004

(51) Int. Cl.
*C09K 7/02* (2006.01)

(52) U.S. Cl. ............... 507/111; 507/110; 507/209; 507/211; 507/212; 507/922

(58) Field of Classification Search ............... 507/110, 507/111, 211, 212, 209, 922
See application file for complete search history.

(56) References Cited

U.S. PATENT DOCUMENTS

| | | | |
|---|---|---|---|
| 3,962,099 A | 6/1976 | Whitfill | 252/8.5 B |
| 4,175,042 A | 11/1979 | Mondshine | 252/8.55 R |
| 4,188,466 A * | 2/1980 | Thivend et al. | 435/18 |
| 4,369,843 A | 1/1983 | Mondshine | 166/292 |
| 4,428,843 A | 1/1984 | Cowan et al. | 252/8.5 C |
| 4,997,581 A | 3/1991 | Williamson et al. | 252/8.551 |
| 5,504,062 A | 4/1996 | Johnson | 507/212 |
| 5,612,293 A | 3/1997 | Swartwout et al. | 507/110 |
| 5,929,002 A | 7/1999 | Joyce et al. | 507/211 |
| 5,948,733 A | 9/1999 | Cawiezel et al. | 507/212 |
| 6,040,276 A | 3/2000 | Audibert et al. | 507/214 |
| 6,247,543 B1 | 6/2001 | Patel et al. | 175/64 |
| 6,380,138 B1 | 4/2002 | Ischy et al. | 507/204 |
| 6,723,683 B1 * | 4/2004 | Crossman et al. | 507/111 |
| 6,800,712 B1 * | 10/2004 | Doane et al. | 527/312 |

FOREIGN PATENT DOCUMENTS

CH    661410 A5 *   7/1987

* cited by examiner

*Primary Examiner*—Philip C. Tucker
(74) *Attorney, Agent, or Firm*—Osha Liang LLP

(57) ABSTRACT

A new fluid system additive is provided that serves to disperse and maintain fluid system solids in a stabilized condition and also "toughen" the filter cake. Fluid systems containing this additive also tolerate calcium contamination better than existing additives, and in laboratory tests simulating well conditions, the treated fluid systems demonstrate good fluid properties at high temperatures (e.g. 250° F.) in contrast to similar fluid systems treated with conventional, more costly additives.

In a preferred embodiment, a composition or additive for use in hydrocarbon exploitation includes a biopolymer derived from at least one species of the family Musaceae.

38 Claims, 5 Drawing Sheets

FLUID SYSTEM ADDITIVE

CROSS-REFERENCE TO RELATED APPLICATIONS

Not Applicable.

STATEMENT REGARDING FEDERALLY SPONSORED RESEARCH OR DEVELOPMENT

Not Applicable.

BACKGROUND OF THE INVENTION

1. Field of the Invention

The present invention generally relates to compositions of and methods used for hydrocarbon exploitation such as the drilling and production of wells, especially oil and gas wells. More particularly, the invention relates to such compositions and methods, which alter the physical or chemical properties of a fluid system, including additives for controlling fluid losses during hydrocarbon exploitation processes.

2. Description of Related Art

In the drilling industry, a hollow drill pipe with a rotary bit attached to the lower end is typically rotated in a borehole to make an oil, gas, thermal or water well. A fluid system (e.g. drilling fluid or "mud") is pumped down the hollow drill pipe, through the bit at the bottom of the borehole, and then up to the surface through the annular space between the drill pipe and the borehole wall. The fluid system lubricates and cools the rotating drill bit, suspends and carries cuttings out of the borehole, coats the wall of the hole with a thin impervious layer of solid material to prevent flow of fluids into or out of the formation, and also exerts a hydrostatic pressure on the formation to counterbalance the pressure of liquids or gases present therein. Loss of fluid can occur due to porosity or cracks in the formation.

Typically, the fluid system is primarily a suspension of solid material, such as clay, in a liquid such as water, but it may also contain a variety of additives or improvements. For the fluid system to perform its functions, it must have certain physical properties. The fluid must have viscosity, and yet be readily pumpable. It must be sufficiently thixotropic to suspend the cuttings in the borehole when fluid circulation stops. The fluid must release cuttings from the suspension when agitating in the settling pits. It must form a thin impervious filter cake on the borehole wall to prevent loss of liquid from the fluid system by filtration into the formations.

A filter cake forms when the fluid system contains particles of size only slightly smaller than the size of the pore openings of the formation. Such a filter cake effectively seals the borehole wall to inhibit any tendencies of sloughing, heaving or cave-in of rock into the borehole. The liquid, which enters the formation while the cake is being established, is known as the surge loss or spurt loss, while the liquid, which enters after the cake is formed, is known as the filtrate. Both the spurt loss and filtration rate must be minimized when penetrating potentially productive formations in order to minimize any damaging effects from fluids entering the formation.

Further, the fluid must be capable of suspending high specific gravity weighting agents, such as barite or other inorganic heavy metal compounds, to maintain sufficient pressure against a formation when necessary. The fluid system should also be able to assimilate finely divided drill cuttings formed during hydrocarbon exploitation operations, and should be able to accept some chemical contaminates without excessively disrupting the physical properties of the fluid system.

To establish and maintain the desired physical properties, a variety of chemicals, clays and weight materials are added to water-based fluids. Rock particles and low-yielding clays are generally incorporated into the fluid system to provide viscosity to the fluid system, to deposit a filter cake that will seal permeable formations in order to limit filtration losses and prevent stuck pipe, and to provide buoyancy for drill cuttings. These solids also affect many fluid system properties adversely, however. As mentioned above, formation clays are unavoidably incorporated into the fluid system, and depending on their nature and amount, the clay minerals can be beneficial or harmful to the fluid system. Because it is not possible to remove all drill solids, especially the very small, colloidal particles, either mechanically or by other means, they must be considered a continual contaminant of a fluid system. Contaminants, such as gypsum, can "cut" the fluid system causing particles to flocculate and the viscosity to increase. When this occurs, there is danger of torquing the drill pipe to the point of breakage or of causing a blowout. At high temperatures, gelation or thickening of the fluid can occur, leading to greatly increased pressure on the recirculation pump. A balance of all the favorable and adverse effects must be achieved in order for the fluid system to provide pressure control to prevent an influx of formation fluid, provide energy at the bit to maximize rate of penetration, provide wellbore stability through pressured or mechanically stressed zones, suspend cuttings and weight material during static periods, permit separation of drilled solids and gas at the surface, and to remove cuttings from the well.

Generally, the term "clay" is used to describe premium ground clay minerals, such as Wyoming bentonite, that are added to increase fluid viscosity and to improve filter cake. Drill cuttings, barite and other solids, however, will increase viscosity (resistance to flow), especially if the particle size degrades into the colloidal range. Colloidal solids produce most of the viscosity in fluid systems due to this surface area increase. For that reason, the volume of colloidal-size solids contained in fluid systems must be controlled and the cation exchange capacity, water adsorption and surface area of clay particles must be taken into account in order to minimize hydrocarbon exploitation problems. Not only is the surface area of clay particles important in determining a fluid's resistance to flow, the clay's chemical composition and its "activity" or electrical charge characteristics also affect how water and chemical contaminants or treatments will interact with the clay particles to alter the fluid's properties.

In an attempt to avoid or to compensate for certain effects, a variety of fluid system additives have been used in the drilling industry. Additives that reduce the spurt loss and filtration rate are referred to as fluid loss control agents. Additives that reduce flow resistance and gel development in fluid systems are referred to as thinners or deflocculants. Some of these additive materials include starches (e.g. corn, potato), starch derivatives, water soluble cellulose derivatives, humates, plant tannins, polyphosphates or phosphate-containing materials, lignite materials, lignosulfonates and synthetic polymers. One of the problems with some of those materials is that they are unstable at the higher temperatures that are typically encountered downhole. Cost and environmental effects of the additives are also important factors. What is needed is a commercially attractive multifunctional fluid system additive, such as a fluid loss control additive, that is capable of stabilizing the fluid properties over a range of temperatures and contaminant levels under hydrocarbon exploitation conditions.

SUMMARY OF PREFERRED EMBODIMENTS

A new fluid system additive is provided that serves to disperse and maintain fluid system solids in a stabilized condition and also "toughen" the filter cake. Fluid systems containing this additive also tolerate calcium contamination better than existing additives, and in laboratory tests simulating well conditions, the treated fluid systems demonstrate good fluid properties at high temperatures (e.g. 250° F.) in contrast to similar fluid systems treated with conventional, more costly additives.

The new fluid system additive may be used for hydrocarbon exploitation in both downhole (e.g. horizontal, vertical drilling) and in surface applications. The additive is not limited to drilling fluid applications, and instead will find use in a variety of servicing (e.g. fracturing fluid), completion, workover, production, reclamation and disposal operations.

In accordance with certain embodiments of the invention, a composition for fluid loss control of fluid systems is provided which includes the flour of at least one species of the banana family, Musaceae. The banana flour may have varying starch to fiber ratios as disclosed below, but preferably has a starch to fiber ratio of at least 7:3. In certain embodiments, the banana flour is modified.

In accordance with yet another embodiment of the invention, a composition for deflocculating or thinning fluid systems is provided which includes the flour of at least one species of the banana family.

In accordance with still another embodiment of the invention, a composition for stabilizing fluid systems is provided which includes the flour of at least one species of the banana family.

In accordance with another embodiment of the invention, a composition for viscosity modification of fluid systems is provided which includes the flour of at least one species of the banana family.

In accordance with still yet another embodiment of the invention, a composition for a loss control material that can rapidly seal formation fractures and/or inhibit the excessive loss of fluid systems is provided which includes the flour of at least one species of the banana family.

In accordance with another embodiment of the invention, a composition for fracturing fluids is provided which includes the flour of at least one species of the banana family.

Also provided in accordance with the present invention is a method of preventing loss of a fluid system. The method includes adding one of the above-described compositions to a fluid system. These and other embodiments, features and advantages of the present invention will become apparent with reference to the following description.

BRIEF DESCRIPTION OF THE DRAWINGS

For a more detailed description of the preferred embodiment of the present invention, reference will now be made to the accompanying drawings, wherein.

DETAILED DESCRIPTION OF PREFERRED EMBODIMENTS

Figure 1:
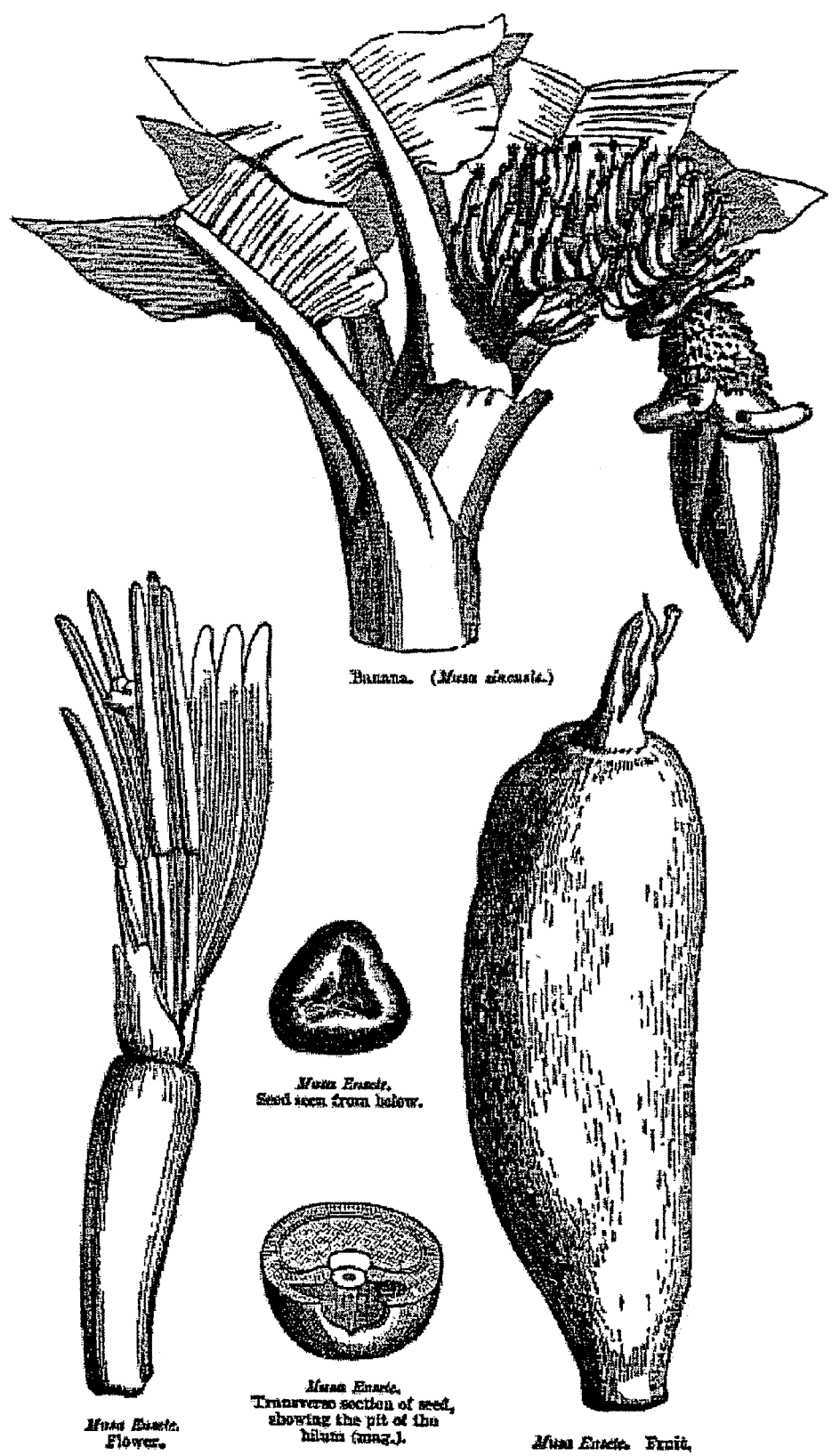
FIG. 1 is a schematic representation illustrating different features which define the banana family.

As stated above, conventional fluid system additives such as fluid loss control additives include starches and starch derivatives. Starches are carbohydrates of a general formula $(C_6H_{10}O_5)n$ and are derived from corn, wheat, oats, rice, potatoes, yucca and similar plants and vegetables. They consist of about 27% linear polymer (amylose) and about 73% branched polymer (amylopectin). The two polymers are intertwined within starch granules. Granules are insoluble in cold water, but soaking in hot water or under steam pressure ruptures their covering and the polymers hydrate into a colloidal suspension. This product is a pregelatinized starch and has been used in fluid systems for many years. Amylose and amylopectin are nonionic polymers that do not interact with electrolytes.

Because conventional unmodified starches have thermal stability to about 250° F. [121° C.] and are subject to bacterial attack unless protected by high salinity or bacteriocide, the trend has been to modify or derivatize starches. Modification of starch can be achieved by chemical or physical methods. Chemical methods include hydrolysis by enzyme or acid and chemical derivatization to impart more hydrophilic or hydrophobic properties. Physical methods include heat-moisture treatment and annealing.

Derivatized starches, such as hydroxypropyl and carboxymethyl starches are currently used in drilling fluids and completion fluids. Being nonionic, hydroxypropyl (HP) starch is only slightly affected by salinity and hardness in fluids. Linear and branched carbohydrate polymers in natural starch have three reactive OH groups on each glucose unit. During manufacture, these polymers are reacted with propylene oxide, adding hydroxypropyl $(CH(OH)CH_2CH_3)$ groups at the OH positions by an ether linkage. By adding the hydroxypropyl groups, the HP starch becomes more resistant to thermal degradation and bacterial attack.

As can be appreciated, the added time and cost to modify or derivatize starches is undesirable. However, due to thermal degradation and bacterial attack, fluid system manufacturers are given few options. With environmental agencies such as the EPA (Environmental Protection Agency) constantly imposing stricter limits, the types of derivatives capable of being used are dwindling.

The present invention offers an environmentally and cost attractive alternative to current starch derivatives. New additives for improving the properties of fluid systems preferably include a dry base mixture prepared by the flour of at least one species of the banana family, Musaceae.

The banana family (Musaceae) includes three genera: *Musa*, *Ensete*, and *Musella*. Together *Musa*, *Ensete*, and *Musella* comprise about 45 species including *Musa acuminata* Colla, *M. X paradisoaca* (hybrid), *Ensete ventricossum* Cheesman (Abyssinian banana), *Musa balbisina* Colla, *M. ornata* Roxb., *M. textilis* Nee, and *Musella lasiocarpa*. Common names for the *Musa* species include banana, bananier nain, canbur, curro, and plantain.

The banana family can be generalized by the following characteristics in combination with FIG. 1. The leaves are alternate and very large, with the proximal concentric, appressed sheathing portions comprising a pseudotrunk from which the individual petioles and blades diverge. The blades are simple with a prominent midrib and numerous penni-parallel lateral veins. Eventually, an inflorescence axis arising from the corm grows upward through the channel formed by the overlapping leaf bases and produces a terminal series of large overlapping bracts, each of which subtends and hides a cymose cluster of flowers. As each cyme reaches anthesis, the subtending bract reflexes to expose the flowers and eventually abscises from the inflorescence axis. The flowers are zygomorphic and functionally unisexual, the proximal ones being female and the distal ones male. The perianth comprises 2 series of 6 petaloid tepals, 5 of which are connate into a 5-lobed tube leaving one inner segment free. The androecium usually consists of 5 fertile stamens and a staminode that is opposite the free tepal. The gynoecium consists of a single compound pistil of 3 carpels, a single style, and an inferior ovary with 3 locules, each containing numerous axile ovules. The fruit is a berry, usually with a leathery, separable exocarp, or peel.

In some embodiments, the flour is prepared from the fruit or flower portion of a member in the Musa species. In other embodiments, the flour is prepared from the fruit or flower portion in combination with the peel of a member in the Musa species. In still other embodiments, the flour is prepared from the peel of a member in the Musa species. The dry powder formed can be readily dissolved in a wide variety of fluids, from fresh water to brines.

A preferred method of preparing banana flour from unripened bananas follows. Both a dry process and a wet process may produce the banana flour. In a preferred embodiment, the banana is frozen before peeling in order to provide white color starch.

In the dry process, the unripened banana is preferably frozen at 0° C. for 24 hours in order to destroy the polyphenol oxidase, which affects the browning of the starch. After freezing, the banana is preferably defrosted by standing at room temperature, and is cut into small pieces or chips and dried in an oven. The dried chips are preferably ground into powder and sieved.

Once sieved, the banana flour is suspended in a basic solution (e.g. NaOH) and any protein is removed using a centrifugal separator. The starch dispersion may be adjusted by varying the pH of the flour (e.g. by adding diluted HCl). After adjusting the starch dispersion, the flour is preferably centrifuged, forming a flour cake, which is dried at 50° C. for 24 hrs. The dried flour cake is preferably milled and sieved.

As stated above, the flour may be unmodified (natural) or modified. It is believed that the prepared banana flour contains between 70–90% starch. In some embodiments, it may be desirable to isolate and/or purify the starch via modification. Modification may be performed by conventional methods (e.g. physical, chemical) to increase the molecular weight of the starch, for example. It is contemplated that modified banana starches may have enhanced thermal resistance (350–400° F.+) and Theological properties. In a preferred embodiment, the banana starches are substantially stable at these high temperatures. Substantially stable is herein defined as not readily altering in chemical makeup or physical state.

Drilling muds containing the above-described additives were evaluated in laboratory tests designed to simulate typical to severe well conditions, and their physical properties were compared under the same test conditions to identical muds containing conventional additives.

EXAMPLES 1–2

Treated muds were prepared as follows: A fluid consisting of natural and modified biopolymers (including a predetermined amount of banana flour prepared by the dry process described above), buffer, defoamer and other salts in water was sheared for 45 minutes at high speed in a Hamilton Beach Mixer, and then aged for 2 hours in a sealed container at room temperature. After aging, a bridging agent and viscosifier were added and the ingredients were sheared for 30 minutes at high speed. The resultant slurry was hot rolled for 16 hours at 170° F. to stabilize the fluid and to allow full hydration of the biopolymers, salts and other solids.

Conventional muds (Dual Flo and FloTrol), which contain modified starches from known plants such as potatoes and corn, have been similarly prepared, with the exception that the conventional modified starches replaced the banana flour of the treated muds.

The compositions of the resultant mud formulations (Examples 1–2, Dual Flo 1, and Flo Trols 1–2) are shown in Table 1. The Theological and filtration properties of the resultant mud formulations were then determined and are reported in Table 2. To determine rheological properties, the samples were mixed and heat aged (static/dynamic) for 16 or more hours. A viscometer (Fann Model 35 or Brookfield) was employed to measure the plastic viscosity (PV), yield point (YP) and low shear rate viscosity (LSRV) of the samples. To determine the filtration rate, static and/or dynamic testing was performed using conventional tools (i.e. HPHT test cells, Fann Model 90 filtration apparatus, paper API).

Benchmark rheological values for a drilling mud include a PV between 10 cp and 40 cp, a YP between 10 lb/100 ft and 40 lb/100 ft, and a LSRV between 15K and 70K, as indicated by the conventional samples. Benchmark filtration values for a drilling mud include a spurt value between 0 and 5 cc and a value of least 10 cc after 30 minutes. Referring still to Table 2, the mud containing the banana flour additive provided the better overall mud properties under the stated test conditions than the more expensive comparative commercial product.

TABLE 1

Conventional Mud Composition Comparison

| | | Dual Flo #1 | | | Flo Trol #1 | | | Ex #1 | | | Flo Trol #2 | | | Ex #2 | | |
| --- | --- | --- | --- | --- | --- | --- | --- | --- | --- | --- | --- | --- | --- | --- | --- | --- | --- |
| Product | Specific Gravity | Conc (ppb) | Vol (per bbl) | Lab Vol (ml) | Conc (ppb) | Vol (per bbl) | Lab Vol (ml) | Conc (ppb) | Vol (per bbl) | Lab Vol (ml) | Conc (ppb) | Vol (per bbl) | Lab Vol (ml) | Conc (ppb) | Vol (per bbl) | Lab Vol (ml) |
| FloVis NT* | 1.5 | 0.75 | 0.001 | 0.500 | 0.75 | 0.001 | 0.500 | 0.75 | 0.001 | 0.500 | 1 | 0.002 | 0.667 | 1 | 0.002 | 0.667 |
| Dual Flo | 1.5 | 5 | 0.010 | 3.333 | X | | | X | | | X | | | X | | |
| FloTrol | 1.5 | X** | | | 5 | 0.010 | 3.333 | X | | | 5 | 0.010 | 3.333 | X | | |

TABLE 1-continued

Conventional Mud Composition Comparison

| | | Dual Flo #1 | | | Flo Trol #1 | | | Ex #1 | | | Flo Trol #2 | | | Ex #2 | | |
|---|---|---|---|---|---|---|---|---|---|---|---|---|---|---|---|---|
| Product | Specific Gravity | Conc (ppb) | Vol (per bbl) | Lab Vol (ml) | Conc (ppb) | Vol (per bbl) | Lab Vol (ml) | Conc (ppb) | Vol (per bbl) | Lab Vol (ml) | Conc (ppb) | Vol (per bbl) | Lab Vol (ml) | Conc (ppb) | Vol (per bbl) | Lab Vol (ml) |
| GBTrol (Banana Flour) | 0.24 | X | | | X | | | 5 | 0.060 | 20.833 | X | | | 5 | 0.060 | 20.833 |
| MgO | 3.65 | 1 | 0.001 | 0.274 | 1 | 0.001 | 0.274 | 1 | 0.001 | 0.274 | 1 | 0.001 | 0.274 | 1 | 0.001 | 0.274 |
| ECF-590 | 1.2 | 1 | 0.002 | 0.833 | 1 | 0.002 | 0.833 | 1 | 0.002 | 0.833 | 1 | 0.002 | 0.833 | 1 | 0.002 | 0.833 |
| SafeCarb | 2.8 | 30 | 0.031 | 10.714 | 30 | 0.031 | 10.714 | 30 | 0.031 | 10.714 | 30 | 0.031 | 10.714 | 30 | 0.031 | 10.714 |
| Product wt (lb/bbl) | | | 37.75 | | | 37.75 | | | 37.75 | | | 38.00 | | | 38.00 | |
| Product vol (bbl/bbl) | | | 0.05 | | | 0.04 | | | 0.09 | | | 0.05 | | | 0.10 | |
| Total lab vol (ml/sample) | | | 15.65 | | | 20.71 | | | 33.15 | | | 15.82 | | | 38.37 | |
| Desired final density (ppg) | | | 11.80 | | | 11.80 | | | 1.80 | | | 11.80 | | | 11.80 | |
| Density of liq fraction (ppg) | | | 11.60 | | | 11.60 | | | 11.60 | | | 11.60 | | | 11.60 | |
| Vol of liq fraction (bbl/bbl) | | | 0.955 | | | 0.955 | | | 0.905 | | | 0.954 | | | 0.905 | |

*Denotes FloVis NT's use as viscosifier.
**Denotes that a component is not present.

TABLE 2

Conventional Mud Rheology/Filtration Comparison

| | Dual Flo #1 | | Flo Trol #1 | | Ex #1 | | Flo Trol #2 | | Ex #2 | |
|---|---|---|---|---|---|---|---|---|---|---|
| Rheology | Start | After Hot Rolling | Start | After Hot Rolling | Start | After Hot Rolling | Start | After Hot Rolling | Start | After Hot Rolling |
| Temperature, °F. | 120 | 170 | 120 | 170 | 120 | 170 | 120 | 250 | 120 | 250 |
| 600 rpm dial reading | 50 | 51 | 55 | 53 | 48 | 56 | 55 | 52 | 56 | 62 |
| 300 rpm dial reading | 37 | 38 | 40 | 39 | 32 | 36 | 40 | 38 | 40 | 42 |
| 200 rpm dial reading | 31 | 32 | 32 | 33 | 26 | 30 | 32 | 33 | 32 | 38 |
| 100 rpm dial reading | 24 | 25 | 24 | 26 | 20 | 22 | 24 | 25 | 24 | 26 |
| 6 rpm dial reading | 11 | 11 | 12 | 12 | 7 | 7 | 12 | 12 | 9 | 10 |
| 3 rpm dial reading | 9 | 9 | 10 | 10 | 6 | 6 | 10 | 10 | 7 | 8 |
| Init. (10 sec) Gel Strength, lb/100 ft | 9 | 9 | 10 | 10 | 6 | 6 | 10 | 10 | 7 | 8 |
| 10 min. Gel Strength, lb/100 ft | 10 | 10 | 12 | 11 | 7 | 7 | 12 | 12 | 9 | 9 |
| Plastic Viscosity, cp | 13 | 13 | 15 | 14 | 16 | 20 | 15 | 14 | 16 | 20 |
| Yield Point, lb/100 ft | 24 | 25 | 25 | 25 | 16 | 16 | 25 | 24 | 24 | 22 |
| 1 min. Low shear rate velocity | | 53 K | | 39.1 K | | 24.7 K | | 38.3 K | | 32.8 K |
| 2 min. Low shear rate velocity | | 47.7 K | | 37.6 K | | 24.4 K | | 37.9 K | | 31.7 K |
| 3 min. Low shear rate velocity | | 45.3 K | | 36 K | | 24.1 K | | 37.7 K | | 28.9 K |
| PH | 9.5 | 9.4 | 9.3 | 9.2 | 8.9 | 9.1 | 9.5 | 9.4 | 9.3 | 9.2 |
| Filtration Rate (vol/time) | | | | | | | | | | |
| 30 sec | | 2.8 ml | | 3.2 ml | | 3.0 ml | | | | |
| 1 min | | 3.0 ml | | 3.3 ml | | 3.0 ml | | | | |
| 30 min | | 7.2 ml | | 7.0 ml | | 3.1 ml | | | | |
| 60 min | | 9.6 ml | | 8.2 ml | | 3.1 ml | | | | |

EXAMPLES 3–7

Examples 3–7 are samples of additional treated muds, prepared according to the above-described method, using various amounts of banana flour. The compositions of the resultant mud formulations are shown in Table 3. The function of various products named in Table 3 is listed in Table 4. Also listed in Table 4 are optional additives commonly used in drilling mud compositions and their functions. The rheological properties of the resultant mud formulations were then determined and are reported in Table 5.

TABLE 3

Composition of Treated Mud as Fluid Loss Controller

CONCENTRATION OF PRODUCT

| SAMPLE | FLUID TYPE (RDF) | DENSITY (PPG) | ECF-688 (LB/BBL) | KCL (3%) (BBL) | BIOVIS (LB/BBL) | SAFECARB (LB/BBL) | KOH (LB/BBL) | MGO (LB/BBL) | NACL (BBL) | $CACL_2$ (11.6 PPG) (BBL) | $CABR_2$ (BBL) |
|---|---|---|---|---|---|---|---|---|---|---|---|
| EX #3 | BIOVIS/STARCH (KCL) | 8.8 | 4 | 0.929 | 1.5 | 32 | 0.25 | | | | |
| EX #4 | BIOVIS/STARCH (NACL) | 9.8 | 4 | | 1.5 | 32 | | 1 | 0.929 | | |
| EX #5 | BIOVIS/STARCH ($CACL_2$) | 9.5 | 4 | | 1.5 | 32 | | 1 | | 0.871 | |
| EX #6 | BIOVIS/STARCH ($CACL_2$) | 9.9 | 4 | | 1.5 | 32 | | 1 | | 0.943 | |
| EX 7 | BIOVIS/STARCH ($CACL_2$) | 11.5 | 4 | | 1.5 | 32 | | 1 | | | 0.971 |

TABLE 4

Product Function

| Product | Function |
|---|---|
| ECF-688 (Banana Flour) | To be determined |
| Duovis (Xanthan gum) | Viscosifier |
| BioVis (Scleroglucan) | Viscosifier |
| DualFlo (Modified starch) | Fluid loss additive |
| SAFECARB (Calcium carbonate) | Sealant & weight agent |
| KCl | |
| MgO, | Buffer, pH control |
| Citric Acid | Buffer, pH control |
| KOH | Buffer, pH control |
| NaCl | |
| $CaCl_2$ | |
| $CaBr_2$ | |
| $KHCO_2$ | |
| K-Formate | |
| Glydril (glycol) | Shale inhibitor/stabilizer |

TABLE 5

Rheology of Treated Mud as Fluid Loss Controller

| | Ex #3 | | | | Ex #4 | | | | Ex #5 | | | |
|---|---|---|---|---|---|---|---|---|---|---|---|---|
| Rheology | Start | After Hot Rolling | | | Start | After Hot Rolling | | | Start | After Hot Rolling | | |
| Temperature, ° F. | 120 | 150 | 210 | 250 | 120 | 150 | 210 | 250 | 120 | 150 | 210 | 250 |
| 600 rpm dial reading | 37 | 42 | 40 | 35 | 72 | 74 | 75 | Deg | 50 | 52 | 49 | Deg |
| 300 rpm dial reading | 28 | 30 | 28 | 24 | 48 | 50 | 53 | " | 35 | 36 | 33 | " |
| 200 rpm dial reading | 24 | 23 | 23 | 20 | 38 | 40 | 43 | " | 30 | 28 | 25 | " |
| 100 rpm dial reading | 19 | 18 | 17 | 15 | 26 | 27 | 30 | " | 21 | 22 | 18 | " |
| 6 rpm dial reading | 10 | 7 | 6 | 5 | 10 | 8 | 9 | " | 8 | 6 | 5 | " |
| 3 rpm dial reading | 9 | 6 | 5 | 4 | 8 | 7 | 7 | " | 7 | 5 | 4 | " |
| Init. (10 sec) Gel Strength, lb/100 ft | 9 | 6 | 5 | 4 | 8 | 7 | 7 | " | 7 | 5 | 4 | |
| 10 min. Gel Strength, lb/100 ft | 10 | 8 | 6 | 5 | 9 | 8 | 8 | " | 8 | 6 | 5 | |
| Plastic Viscosity, cp | 9 | 12 | 12 | 11 | 24 | 24 | 22 | " | 15 | 16 | 16 | " |
| Yield Point, lb/100 ft | 19 | 18 | 16 | 13 | 24 | 26 | 31 | " | 20 | 20 | 17 | " |
| 1 min. Low shear rate velocity | 32 K | 22 K | 13K | 10K | 24K | 25K | 30K | " | 16K | 18K | 10K | " |

TABLE 5-continued

Rheology of Treated Mud as Fluid Loss Controller

| | | | | | | | | | | | | |
|---|---|---|---|---|---|---|---|---|---|---|---|---|
| 2 min. Low shear rate velocity | 30 K | 22 K | 14 K | 11 K | 20 K | 20 K | 30 K | " | 15 K | 17 K | 10 K | " |
| 3 min. Low shear rate velocity | 29 K | 22 K | 14 K | 12 K | 19 K | 19 K | 29 K | " | 15 K | 16 K | 9 K | " |
| PH | 10.4 | 10.2 | 10.2 | 10.2 | 9.9 | 9.6 | 9.6 | 9.6 | 8.4 | 8.2 | 8.2 | |

| | Ex #6 | | | | Ex #7 | | | |
|---|---|---|---|---|---|---|---|---|
| Rheology | Start | After Hot Rolling | | | Start | After Hot Rolling | | |
| Temperature, °F. | 120 | 150 | 210 | 250 | 120 | 150 | 210 | 250 |
| 600 rpm dial reading | 69 | 80 | 65 | Deg | 110 | 129 | 95 | Deg |
| 300 rpm dial reading | 45 | 52 | 40 | " | 75 | 80 | 61 | " |
| 200 rpm dial reading | 37 | 41 | 32 | " | 56 | 61 | 47 | " |
| 100 rpm dial reading | 27 | 28 | 21 | " | 37 | 40 | 31 | " |
| 6 rpm dial reading | 11 | 8 | 4 | " | 14 | 12 | 8 | " |
| 3 rpm dial reading | 9 | 7 | 3 | " | 12 | 10 | 6 | " |
| Init. (10 sec) Gel Strength, lb/100 ft | 9 | 7 | 3 | " | 12 | 10 | 6 | " |
| 10 min. Gel Strength, lb/100 ft | 10 | 9 | 4 | " | 13 | 11 | 7 | " |
| Plastic Viscosity, cp | 24 | 28 | 25 | " | 35 | 49 | 34 | 0 |
| Yield Point, lb/100 ft | 21 | 24 | 15 | " | 40 | 31 | 27 | 0 |
| 1 min. Low shear rate velocity | 25 K | 17 K | 6 K | " | 30 K | 33 K | 9 K | " |
| 2 min. Low shear rate velocity | 25 K | 17 K | 4 K | " | 29 K | 28 K | 9 K | " |
| 3 min. Low shear rate velocity | 24 K | 16 K | 5 K | " | 28 K | 27 K | 9 K | " |
| PH | 8.4 | 8.3 | 8.3 | | | | | |

EXAMPLES 8–14

Examples 8–14 are samples of additional treated muds, prepared according to the above-described method, using various amounts of banana flour. The compositions of the resultant mud formulations are shown in Table 6. The rheological properties of the resultant mud formulations were then determined and are reported in Table 7.

In Tables 6 and 7, a banana flour additive was evaluated as a viscosifier and fluid loss controller. Referring to Examples 13 and 14, the compositions are in the form of viscous, solids-free (SF) pills. Solids-free is herein defined as containing less than about 10% volume of solids. The gelling properties of these pills suggest that compositions prepared with a banana flour additive may be used as a loss circulation material (LCM).

Referring still to Table 7, Example #10 provided the better overall mud properties under the stated test conditions than other treated mud samples. As can be appreciated from Table 7, the banana flour additive may be used alone or with other additives in synergistic ways.

TABLE 6

Composition of Treated Mud as Viscosifier and Fluid Loss Controller

| | | | | | | | | | | | | |
|---|---|---|---|---|---|---|---|---|---|---|---|---|
| | | | | | | | | CONCENTRATION OF PRODUCT | | | | |
| SAMPLE | FLUID TYPE (RDF) | DENSITY (PPG) | ECF-688 (LB/BBL) | KCL (LB/BBL) | DUOVIS (LB/BBL) | KOH (LB/BBL) | CITRIC ACID (LB/BBL) | SAFECARB (LB/BBL) | KHCO$_2$ (BBL) | K-FORMATE (12.5 PPG) (BBL) | CABR$_2$ (14.2 PPG) (BBL) | MGO (LB/BBL) |
| Ex #8 | FLOPRO NT (KCl) | 8.8 | 4 | 10.7 | 1 | 0.25 | 0.25 | 32 | | | | |
| Ex #9 | FLOPRO NT (K-Citrate) | 12.2 | 3 | | 1 | 0.25 | 0.25 | 32 | 0.929 | | | |
| Ex #10 | FLOPRO NT (K-Formate) | 12.2 | 3 | | 1 | 0.25 | 0.25 | 32 | | 0.943 | | |
| Ex #11 | FLOPRO NT (CaBr$_2$) | 14.0 | 4 | | | | | 32 | | | 0.943 | 1 |
| Ex #12 | FLOPRO NT (CaBr$_2$) | 14.05 | 4 | | | | | 32 | | | 0.971 | 1 |
| Ex #13 | Viscous Pills SF (CaBr$_2$) | 13.80 | 12 | | | | | | | | 0.971 | 1 |
| Ex #14 | Viscous Pills SF (CaBr$_2$) | 14.02 | 4 | | | | | | | | 0.971 | 1 |

TABLE 7

Rheology of Treated Mud as Viscosifier and Fluid Loss Controller

| Rheology | Ex #8 | | | | Ex #9 | | | | | Ex #10 | | | | | Ex #11 | | | |
|---|---|---|---|---|---|---|---|---|---|---|---|---|---|---|---|---|---|---|
| | Start | After Hot Rolling | | | Start | After Hot Rolling | | | | Start | After Hot Rolling | | | | Start | After Hot Rolling | | |
| Temperature, °F. | 120 | 150 | 210 | 250 | 120 | 150 | 210 | 250 | 300 | 120 | 150 | 210 | 250 | 300 | 120 | 150 | 210 | 250 |
| 600 rpm dial reading | 37 | 42 | 40 | 35 | 51 | | | | 55 | 56 | | | | 50 | | 95 | 96 | 93 |
| 300 rpm dial reading | 28 | 30 | 28 | 24 | 30 | | | | 36 | 38 | | | | 33 | | 70 | 66 | 62 |
| 200 rpm dial reading | 24 | 23 | 23 | 20 | 23 | | | | 28 | 32 | | | | 27 | | 54 | 53 | 49 |
| 100 rpm dial reading | 19 | 18 | 17 | 15 | 13 | | | | 20 | 23 | | | | 19 | | 39 | 38 | 33 |
| 6 rpm dial reading | 10 | 7 | 6 | 5 | 3 | | | | 7 | 9 | | | | 7 | | 12 | 11 | 9 |
| 3 rpm dial reading | 9 | 6 | 5 | 4 | 2 | | | | 6 | 8 | | | | 6 | | 10 | 9 | 7 |
| Init. (10 sec) Gel Strength, lb/100 ft | 9 | 6 | 5 | 4 | 2 | | | | 6 | 8 | | | | 6 | | 10 | 9 | 7 |
| 10 min. Gel Strength, lb/100 ft | 10 | 8 | 6 | 5 | 3 | | | | 7 | 9 | | | | 7 | | 12 | 13 | 8 |
| Plastic Viscosity, cp | 9 | 12 | 12 | 11 | 21 | 0 | 0 | 0 | 19 | 18 | 0 | 0 | 0 | 17 | 0 | 25 | 30 | 31 |
| Yield Point, lb/100 ft | 19 | 18 | 16 | 13 | 9 | 0 | 0 | 0 | 17 | 20 | 0 | 0 | 0 | 16 | 0 | 45 | 36 | 31 |
| 1 min. Low shear rate velocity | 32 K | 22 K | 13 K | 10 K | | | | | 8 K | 30 K | | | | 15 K | | 51 K | 59 K | 17 K |
| 2 min. Low shear rate velocity | 30 K | 22 K | 14 K | 11 K | | | | | 8 K | 28 K | | | | 14 K | | 46 K | 64 K | 17 K |
| 3 min. Low shear rate velocity | 29 K | 22 K | 14 K | 12 K | | | | | 9 K | 28 K | | | | 14 K | | 45 K | 64 K | 16 K |
| PH | 10.4 | 10.2 | 10.2 | 10.2 | 9.9 | | | | 9.6 | 9.4 | | | | 9.1 | | 7.9 | 7.9 | 7.9 |

| Rheology | Ex #12 | | | | Ex #13 | | | | | Ex #14 | | | | |
|---|---|---|---|---|---|---|---|---|---|---|---|---|---|---|
| | Start | After Hot Rolling | | | Start | After Hot Rolling | | | | Start | After Hot Rolling | | | |
| Temperature, °F. | 120 | 150 | 210 | 250 | 120 | 150 | 210 | 250 | 300 | 120 | 150 | 210 | 250 | 300 |
| 600 rpm dial reading | | 108 | 125 | | | 106 | | | | | 49 | 67 | | |
| 300 rpm dial reading | | 75 | 95 | | | 68 | | | | | 30 | 43 | | |
| 200 rpm dial reading | | 62 | 77 | | | 53 | | | | | 23 | 33 | | |
| 100 rpm dial reading | | 46 | 57 | | | 35 | | | | | 14 | 22 | | |
| 6 rpm dial reading | | 17 | 20 | | | 10 | | | | | 4 | 6 | | |
| 3 rpm dial reading | | 13 | 15 | | | 9 | | | | | 3 | 5 | | |
| Init. (10 sec) Gel Strength, lb/100 ft | | 13 | 15 | | | 9 | | | | | 3 | 5 | | |
| 10 min. Gel Strength, lb/100 ft | | 14 | 19 | | | 10 | | | | | 4 | 6 | | |
| Plastic Viscosity, cp | 0 | 33 | 30 | 0 | 0 | 38 | 0 | 0 | 0 | 0 | 19 | 24 | 0 | 0 |
| Yield Point, lb/100 ft | 0 | 42 | 65 | 0 | 0 | 30 | 0 | 0 | 0 | 0 | 11 | 19 | 0 | 0 |
| 1 min. Low shear rate velocity | | 48 K | 59 K | | | 29 K | >100 K | | | | 13 K | 23 K | | |
| 2 min. Low shear rate velocity | | 48 K | 60 K | | | 27 K | >100 K | | | | 12 K | 23 K | | |
| 3 min. Low shear rate velocity | | 47 K | 60 K | | | 24 K | >100 K | | | | 11 K | 22 K | | |
| PH | | 7.9 | 7.8 | | | 7.8 | | | | | 7.2 | 7.4 | | |

Figure 2:
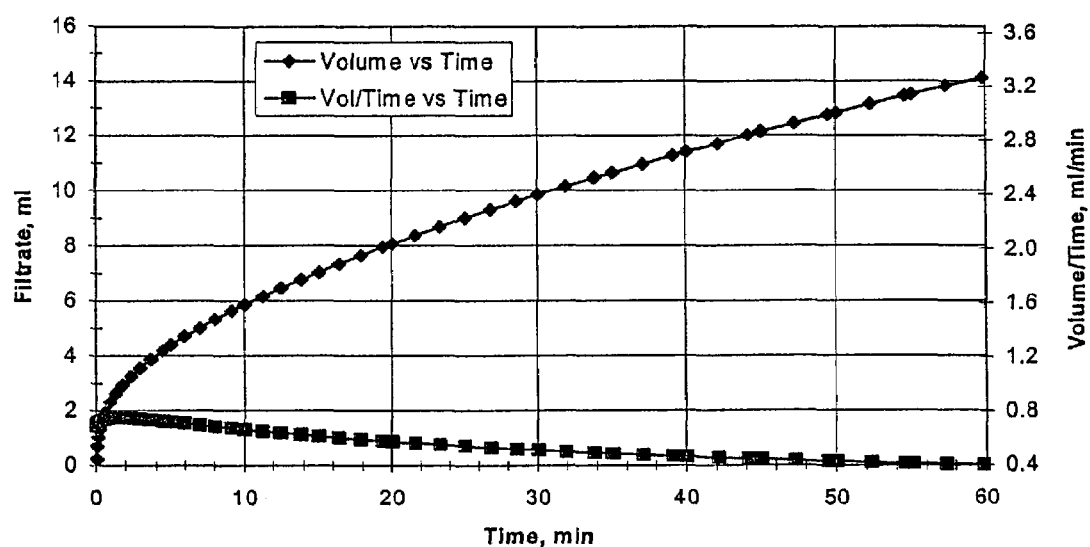
FIG. 2 is a graph illustrating the filtration properties of Example 9.

In addition to rheological properties, filtration rate is a parameter of interest. As discussed in the background section, both the spurt loss and filtration rate must be minimized when penetrating potentially productive formations in order to minimize any damaging effects from fluids entering the formation. FIG. 2, Table 8 and FIG. 3, Table 9, and FIG. 4 illustrate the filtration rate and related properties of Examples 9, 10, and 12 respectively.

Referring initially to FIG. 2 and Table 8, the Cake Deposit Index (CDI) of Example 9 (K-Citrate system) is high and the Dynamic Filtration Rate (DFR) is low. Also, in comparison with FIG. 3, the Dynamic Filtrate (DF) of the K-Citrate system is lower than in the K-Formate system.

Figure 3:
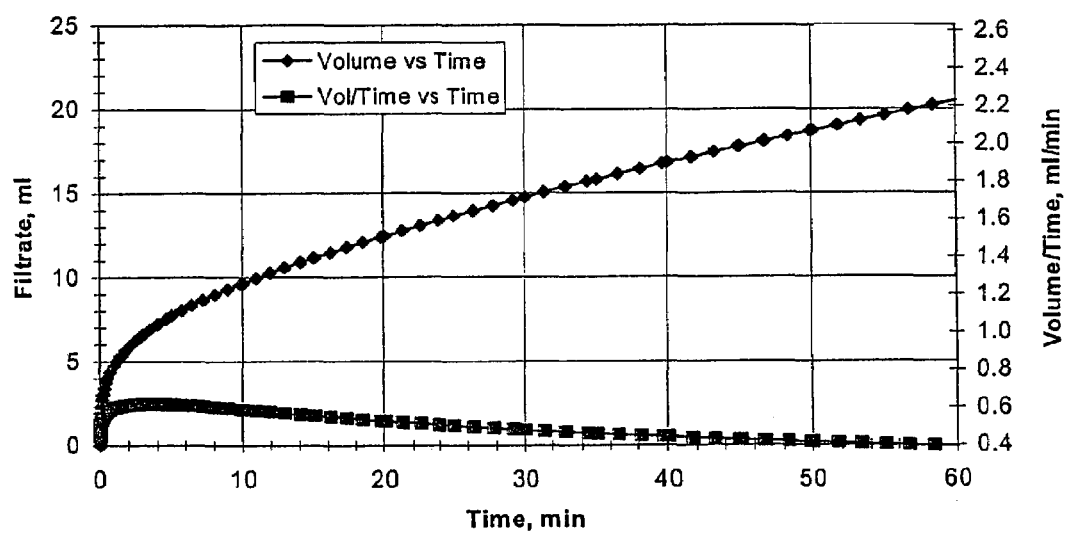
FIG. 3 is a graph illustrating the filtration properties of Example 10.
Figure 4:
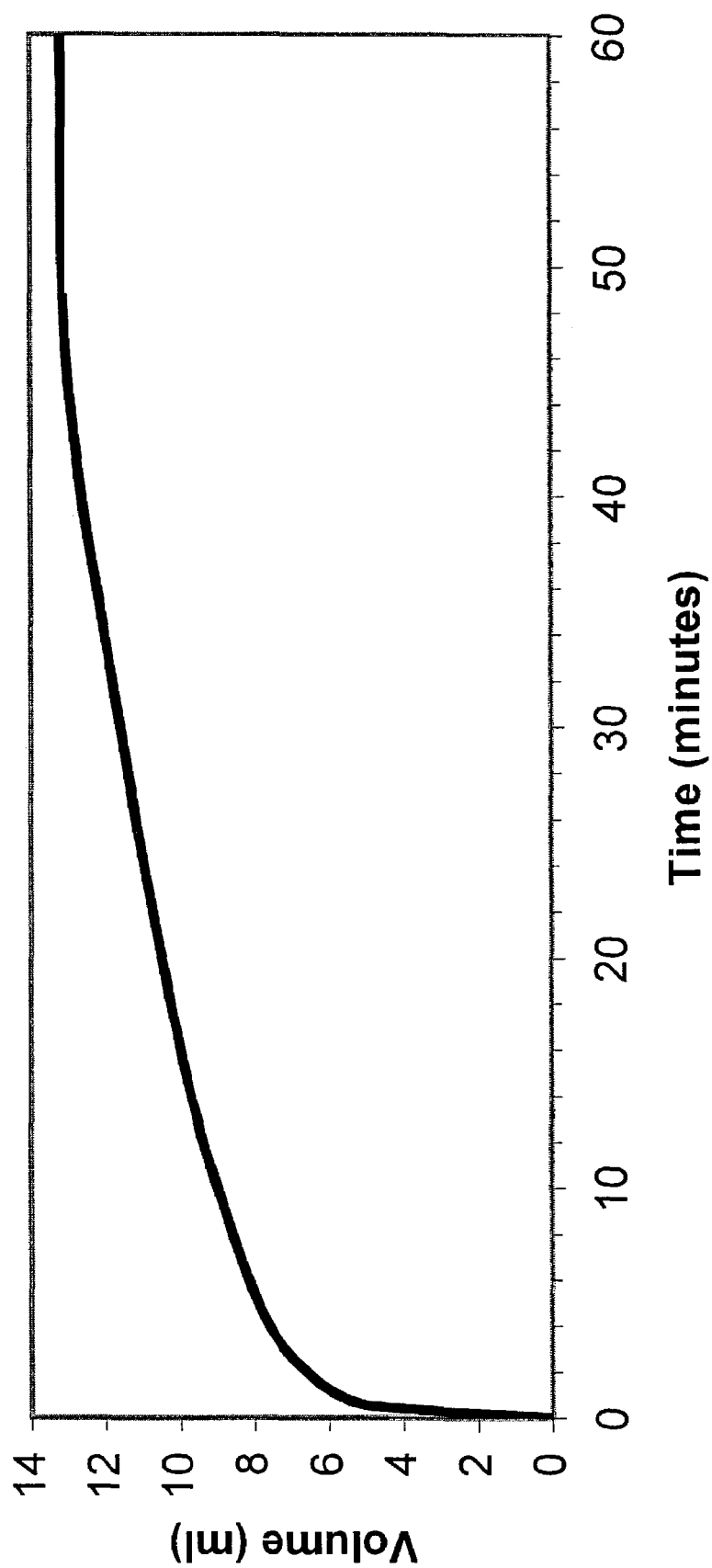
FIG. 4 is a graph illustrating the filtration properties of Example 12.

Referring still to FIG. 3 and Table 9, the CDI of Example 10 (K-Formate system) is low. This indicates that the formation of the filter cake has almost reached steady state. Therefore, any additional cake that will be deposited will not affect the DFR.

TABLE 8

Filtration Properties of Ex #9
Ex #9 (K-Citrate)

| Property | Value |
| --- | --- |
| Dynamic Filtrate (DF) 1 hr, ml | 14.3 |
| Dynamic Filtration Rate (DFR), ml-min | 0.24 |
| Cake Deposition Index (CDI), ml-hr$^2$ | 17.1 |
| Time interval, min | 60.0 |
| Avg Temp, ° F. | 300.2 |
| Aloxite Core, μm | 20.0 |
| Avg Δ Pressure, psi | 502.2 |
| Spurt loss after 8 sec | 1.03 |

TABLE 9

Filtration Properties of Ex #10
Ex #10 (K-Formate)

| Property | Value |
| --- | --- |
| Dynamic Filtrate (DF) 1 hr, ml | 20.5 |
| Dynamic Filtration Rate (DFR), ml-min | 0.34 |
| Cake Deposition Index (CDI), ml-hr$^2$ | 3.4 |
| Time interval, min | 60.0 |
| Avg Temp, ° F. | 300.6 |
| Aloxite Core, μm | 20.0 |
| Avg Δ Pressure, psi | 500.9 |
| Spurt loss after 10 sec | 2.71 |

In addition to the above rheological and filtration properties, pH, filter cake thickness, solubility of filter cake in different breakers (acids, oxidizers, enzymes) is also of interest. For example, an acid solubility test (ASTM D3042) was performed on a banana flour sample, where the testing procedure included immersing the mentioned sample in 15% HCl, boiling the sample, and filtering the sample through a 0.45-micron filter. The sample proved to be 95.1% soluble. This provides insight that compositions prepared with a banana flour additive may be used in fracturing fluids due to carrying properties and easy breaking with acid.

Additional testing performed includes contamination testing (e.g. from sea water, excess drilled solids, and excess barite) and dispersion and swelling of contacting rock (Shale). Referring now to Table 10, contamination testing for various materials is shown. Table 11 lists the formulation of the base fluid in Table 10.

TABLE 10

| | Contamination Testing | | | | | | | |
| --- | --- | --- | --- | --- | --- | --- | --- | --- |
| | Base Fluid (8.4 Lb/gal) | | Base Fluid + 135 lb Barite | | Base Fluid + 10% Drilled Solids | | Base Fluid + 10% Sea Water | |
| Rheology | Start | After Hot Rolling | Start | After Hot Rolling | Start | After Hot Rolling | Start | After Hot Rolling |
| Temperature, ° F. | 120 | 150 | 120 | 150 | 120 | 150 | 120 | 150 |
| 600 rpm dial reading | 36 | 36 | 57 | 52 | 47 | 40 | 35 | 34 |
| 300 rpm dial reading | 26 | 26 | 41 | 39 | 35 | 30 | 25 | 24 |
| 200 rpm dial reading | 22 | 23 | 34 | 33 | 30 | 26 | 20 | 19 |
| 100 rpm dial reading | 17 | 18 | 26 | 25 | 23 | 20 | 15 | 14 |
| 6 rpm dial reading | 7 | 8 | 10 | 9 | 9 | 8 | 6 | 5 |
| 3 rpm dial reading | 6 | 6 | 8 | 7 | 8 | 6 | 5 | 4 |
| Init. (10 sec) Gel Strength, lb/100 ft | 6 | 6 | 8 | 7 | 8 | 6 | 5 | 4 |
| 10 min. Gel Strength, lb/100 ft | 6 | 7 | 9 | 8 | 8 | 7 | 6 | 5 |
| Plastic Viscosity, cp | 10 | 10 | 16 | 13 | 12 | 10 | 11 | 10 |
| Yield Point, lb/100 ft | 16 | 16 | 25 | 26 | 27 | 20 | 14 | 14 |
| PH | 9.5 | 9.4 | 9.5 | 9.4 | 9.5 | 9.4 | 9.5 | 9.4 |

TABLE 11

Base Fluid Composition

| Base Fluid | Concentration |
|---|---|
| ECF-688 | 4 lb/bbl |
| MgO | 1 lb/bbl |
| DuoVis | 1 lb/bbl |
| SafeCarb | 32 lb/bbl |
| KCl | 10.7 lb/bbl |
| Citric Acid | 1 lb/bbl |
| Water | 0.971 bbl |
| Biocide | 0.25 lb/bbl |

Figure 5:
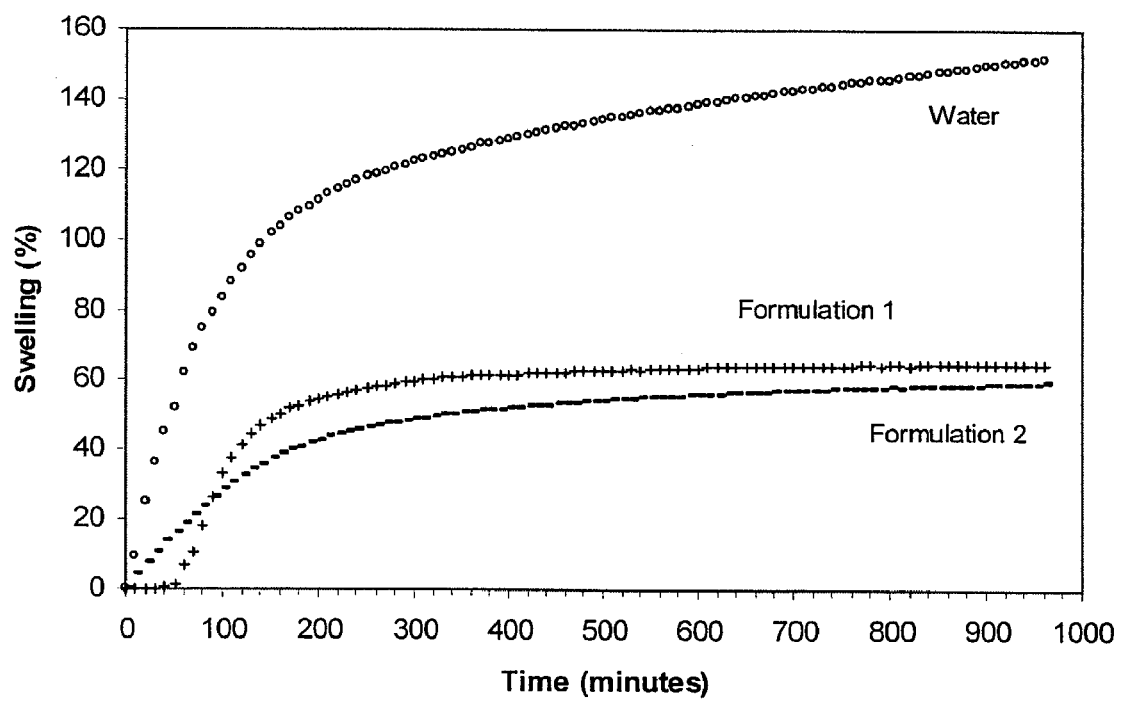
FIG. 5 is a graph illustrating the swelling of contacting shale by various formulations.

Table 12 and FIG. 5 illustrate the swelling of contacting shale and Table 13 lists the results of a dispersion test using the formulations of Table 12.

TABLE 12

Formulations for Swelling Testing

| | | | | | Concentration | | | | |
|---|---|---|---|---|---|---|---|---|---|
| Formulation | Density (ppg) | ECF-688 (lb/bbl) | MgO (lb/bbl) | DuoVis (lb/bbl) | SafeCarb (lb/bbl) | K-Citrate (lb/bbl) | Citric Acid (lb/bbl) | Water (bbl) | Biocide (lb/bbl) |
| #1 | 10.3 | 8 | 1 | 1 | 0 | 140 | 1 | 0.971 | 0.25 |
| #2 | 10.3 | 4 | 1 | 1 | 32 | 100 | 1 | 0.971 | 0.25 |

TABLE 13

Dispersion Test Results

| Formulation | % Recovery |
|---|---|
| #1 | 89 |
| #2 | 93 |
| Water | 2 |

The swelling testing was performed using a swell-meter on a shale formation material in the form of compressed pellets (5 g/25,000 psi). The dispersion test was performed after the formulations had been hot rolled for 16 hours at 150° F. The % Recovery of the dispersion test is related to the drill cuttings retained by a U.S. mesh #30 sieve.

As shown in FIG. 5, both Formulation #1 and #2 have a markedly lower swelling percentage than water in shale. Compared to water, Formulation #1 has approximately a 67% swelling reduction and Formulation #2 has approximately a 71% swelling reduction. Referring back to Table 13, Formulation #1 and #2 also have a much higher recovery percentage than water.

A unique property of mud compositions prepared with various amounts of banana flour additive described above is that they still demonstrate good fluid properties even after being subjected to a 250° F. temperature for reasonable and expected intervals during operations, similar to muds that were prepared with conventional additives (i.e. modified starches). The preferred additives of the present invention are suited for adding to fluid systems used in hydrocarbon exploitation operations. Because the filter cake that results is firmer and more slippery than with conventionally treated muds, fluid systems containing the new additives are also expected to facilitate hydrocarbon exploitation. Without wishing to be limited to a particular theory, it is believed that the components of the additive thin the mud (i.e., reduce the viscosity or resistance to flow) primarily by decreasing the electrochemical forces between the solid particles and causing deflocculation and dispersion of the solids. It is expected that fluid systems containing the new additive will have desirable Theological and fluid loss properties in the field after exposure to shear, elevated temperature and after incorporation of additional drill solids and chemical contaminants.

In addition, while the banana additive has been tested for use in drilling fluids, it is believed that the banana additive will be successful in other hydrocarbon exploitation operations including compositions used in servicing, completion, workover, production, reclamation and disposal operations. Particular uses of interest include as an additive in fracturing fluids and as an additive for formation sealing fluids. Also, because the banana additive is a natural source of potassium, it may be used to inhibit formation swelling.

Although the banana flour additive has been described for use in an aqueous-based fluid and in a viscous, solids-free pill, it is recognized that any suitable vehicle for carrying the banana flour additive to its desired location may be used. For example, any water based fluid or solid medium may be used. It is also contemplated that oil based fluids may be used. Fluid is herein defined as a continuous, amorphous substance whose molecules move freely past one another and that has the tendency to assume the shape of its container (i.e. a liquid or gas). It will be understood that fluid mediums include colloidal and colloidal-like systems (e.g. gels). Solid is herein defined as a substance that is held in a fixed form by cohesion among its particles. It will be understood that solid mediums include particulate systems such as sand.

While the preferred embodiments of the invention have been shown and described, modifications thereof can be made by one skilled in the art without departing from the spirit and teachings of the invention. The embodiments described herein are exemplary only, and are not intended to be limiting. Many other variations and modifications of the invention disclosed herein are possible and are within the scope of the invention. For example, in addition to aging and bridging agents, viscosifiers, lubricants, corrosion inhibitors, oxygen scavenger, etc. may be added to the present fluid systems. The disclosures of all publications, patents and patent applications cited above are hereby incorporated herein by reference.

What is claimed is:

1. A fluid system for use in hydrocarbon exploitation comprising:
   a continuous liquid phase;
   a biopolymer derived from at least one species of the family Musaceae; and a weighting agent to increase the density of the fluid system, wherein the rheological properties of said fluid system are substantially stable over a temperature range of about 120° F. to 250° F.

2. The fluid system according to claim 1 wherein the biopolymer is derived from plants in the group consisting of the genus *Ensete*, the genus *Musella*, and the genus *Musa*.

3. The fluid system according to claim 1 wherein the weighting agent is a solid material that is at least partially soluble in the continuous liquid phase.

4. The fluid system according to claim 3 wherein the Musaceae-derived biopolymer comprises *Musa* flour.

5. The fluid system according to claim 4 wherein the *Musa* flour is prepared from a component of the group consisting of fruit, peel, or combinations thereof.

6. The fluid system according to claim 4 wherein the *Musa* flour has a starch to fiber ratio of about 7:3 or greater.

7. The fluid system according to claim 4 wherein the *Musa* flour comprises at least 70% starch.

8. The fluid system according to claim 1 wherein the continuous liquid phase is an aqueous based fluid.

9. The fluid system according to claim 1 wherein the weighting agent is selected from the group consisting of calcium carbonate, calcium bromide brine, potassium formate brine, potassium citrate brine and potassium chloride brine.

10. The fluid system according to claim 1 wherein the Musaceae-derived biopolymer is chemically or physically modified.

11. The fluid system according to claim 10 wherein the rheological properties of said fluid system are substantially stable at about 350° F.

12. The fluid system according to claim 10 wherein the rheological properties of said fluid system are substantially stable at temperatures greater than 400° F.

13. The fluid system according to claim 1 wherein the continuous liquid phase comprises a gelled continuous liquid phase structure.

14. The fluid system according to claim 1 wherein the Musaceae-derived biopolymer comprises a fluid loss control additive.

15. The fluid system according to claim 1 wherein the Musaceae-derived biopolymer comprises a fluid thinning additive.

16. The fluid system according to claim 1 wherein the Musaceae-derived biopolymer comprises a thermal resistance additive.

17. The fluid system according to claim 1 further comprising at least one component chosen from the group consisting of viscosifiers, biopolymers other than the Musaceae-derived biopolymer, thinners, bridging agents, aging agents, lubricants, corrosion inhibitors, and oxygen scavengers.

18. The fluid system according to claim 1 wherein the Musaceae-derived biopolymer comprises a loss circulation material.

19. The fluid system according to claim 18 wherein the loss circulation material comprises a substantially solids-free pill.

20. The fluid system according to claim 18 wherein the Musaceae-derived biopolymer is chemically or physically modified such that the rheological properties of said loss circulation material are substantially stable at about 350° F.

21. A method of drilling a well, comprising:
injecting a fluid system into the well, wherein the fluid system comprises a continuous liquid phase and a biopolymer derived from at least one species of the family Musaceae; and
permitting the fluid system to form a filter cake.

22. The method according to claim 21 wherein the filter cake has filtration properties that are substantially stable at about 250° F.

23. The method according to claim 21 wherein the Musaceae-derived biopolymer is unmodified.

24. The method according to claim 23 wherein the rheological properties of said fluid system are substantially stable over a temperature range of about 120° F. to 250° F.

25. The method according to claim 21 wherein the Musaceae-derived biopolymer is chemically or physically modified.

26. The method according to claim 25 wherein the rheological properties of said fluid system are substantially stable at about 350° F.

27. The method according to claim 25 wherein the rheological properties of said fluid system are substantially stable at temperatures greater than 400° F.

28. The method according to claim 21 further comprising at least one component chosen from the group consisting of viscosifiers, biopolymers other than the Musaceae-derived biopolymer, thinners, bridging agents, aging agents, lubricants, corrosion inhibitors, and oxygen scavengers.

29. The method according to claim 21 wherein the Musaceae-derived biopolymer comprises a source of potassium.

30. A method of servicing a well, comprising:
injecting a fluid system into the well, wherein the fluid system comprises a continuous liquid phase and a biopolymer derived from at least one species of the family Musaceae; and
permitting the fluid system to form a filter cake.

31. The method according to claim 30 wherein the filter cake has filtration properties that are substantially stable at about 250° F.

32. The method according to claim 30 wherein the Musaceae-derived biopolymer is unmodified.

33. The method according to claim 32 wherein the rheological properties of said fluid system are substantially stable over a temperature range of about 120° F. to 250° F.

34. The method according to claim 30 wherein the Musaceae-derived biopolymer is chemically or physically modified.

35. The method according to claim 34 wherein the rheological properties of said fluid system are substantially stable at about 350° F.

36. The method according to claim 34 wherein the rheological properties of said fluid system are substantially stable at temperatures greater than 400° F.

37. The method according to claim 30 further comprising at least one component chosen from the group consisting of viscosifiers, biopolymers other than the Musaceae-derived biopolymer, thinners, bridging agents, aging agents, lubricants, corrosion inhibitors, and oxygen scavengers.

38. The method according to claim 30 wherein the Musaceae-derived biopolymer comprises a source of potassium.

* * * * *